G. L. HALVARDSON.
REVERSIBLE BRUSH HOLDER.
APPLICATION FILED JULY 29, 1911.

1,155,921.

Patented Oct. 5, 1915.

Witnesses
Geo. Ackman Jr.
R. B. Cavanagh.

Inventor
Gustaf L. Halvardson
By Victor J. Evans
Atty.

UNITED STATES PATENT OFFICE.

GUSTAF LEANDER HALVARDSON, OF STOCKHOLM, SWEDEN.

REVERSIBLE BRUSH-HOLDER.

1,155,921.  Specification of Letters Patent.  Patented Oct. 5, 1915.

Application filed July 29, 1911. Serial No. 641,202.

*To all whom it may concern:*

Be it known that I, GUSTAF LEANDER HALVARDSON, a subject of the King of Sweden, residing at Varfsgatan 10, in Stockholm, Sweden, electrician, have invented a Reversible Brush-Holder, of which the following is a specification.

In the previous application for patent dated Aug. 11, 1910, Ser. No. 576,729, I have described an electromotor adapted to drive church bells and the like and characterized by a movable brushrocker which partakes in the rotation of the rotary part of the motor between suitable limits so as to render the motor adapted to drive the bell in both directions, the motor being there described as a direct current motor. I have now found that the same principle is applicable to an alternating current motor if this is constructed in a suitable manner.

One part of the present invention consists in constructing an alternating current motor for bell ringing purposes.

Another part consists in a modification, where the brush-rocker need not partake in the rotation, a separate contact-bearer being used for the same purpose.

The invention involves also some minor variations and several resistance-devices which, though generally dispensable, are sometimes used with advantage.

Figure 1:
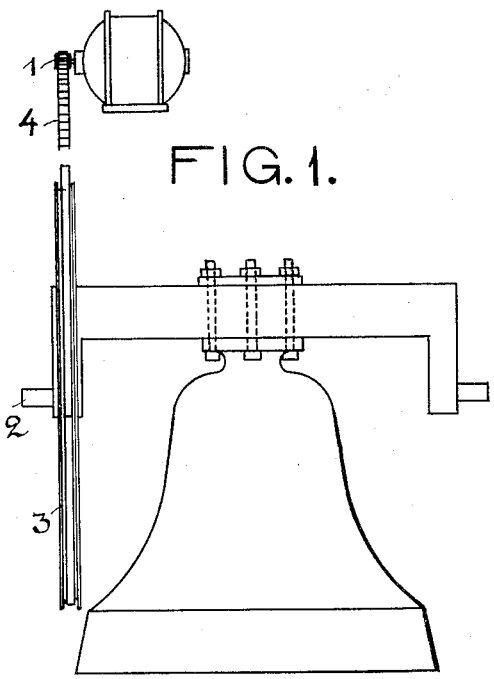
Figures 2, 3:
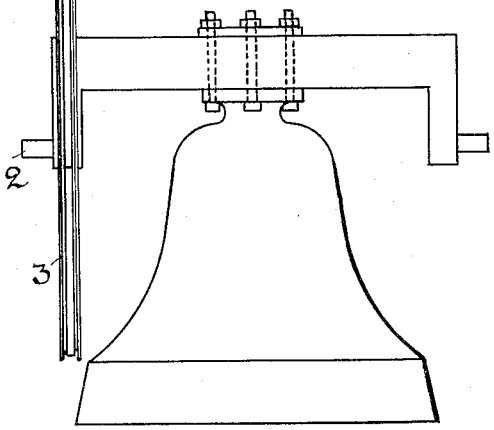

On the annexed drawings Figure 1 is a side view of a bell and an electromotor connected therewith. Fig. 2 is end view of a direct current motor showing the preferred form of the brush-rocker and its bearing and the locking hook. Fig. 3 is end view of an alternating current motor constructed according to this invention.

A large pulley 3 (Fig. 1) or the like fixed on the bell shaft 2 is connected by means of a chain 4 to a sprocket 1 fixed on the motor shaft, the part of said chain which never reaches the sprocket being substituted by a rope, wire, belt or the like, if preferred.

The direct current motor Fig. 2 is of any suitable construction and it is sufficient now to describe the improvements belonging to the present invention. In order to force the brush-rocker to positively partake in the movement of the motor when this is compelled to change its direction of rotation the brush-rocker is preferably shaped as a ring 75 which surrounds and frictionally engages the edge of a disk 76 or the like fixed on the motor shaft. Studs 13, 14 or the like fixed on ring 75 are adapted to strike the fixed stop 12 so as to limit the rotation of ring 75 in both directions. The hook 15 pivoted on stop 12 or on other stationary part is balanced so as to enter the notch 77 and thus lock the ring 75, when the other end 78 is not attracted by the motor magnets. The studs 13, 14 are so placed, that the ring 75 will be stopped when it is moved an angle corresponding to the distance between two adjacent magnets (a pole-distance).

The motor shown in Fig. 3 is adapted to be fed with alternating current. The construction of this motor may be most easily described by saying that it consists of a common alternating current motor the rotary part of which is taken away and substituted by the armature (rotor) of a common direct current motor. This new alternating current motor has thus a commutator and the brush rocker of said commutator is free to rotate between suitable limits so as to automatically partake in the rotation of the rotor within said limits. The studs 13, 14 which strike the fixed stop 12 and thus determine said limits, may be adjustable so as to admit of determining their proper place empirically. The brush-rocker 75 is preferably arranged as already stated with regard to Fig. 3. The hook 15 may also be used but is here usually dispensable.

It should be noted that the use of a disk 76 or the like as a bearing for the brush-rocker 76, as shown in Figs. 2 and 3, will render it possible to compensate the variation of resistance in the metallic parts due to the variation of temperature. The diameter of said disk 76 can obviously be taken as large as is necessary and the bearing for the brush-rocker may be greased by solid fat for the same purpose.

Claim:

The combination in an electric motor having a commutator and brushes bearing thereon, of an oscillatory rocker carrying said brushes and comprising a disk fixed to the armature shaft, a ring surrounding said disk and frictionally engaging the periphery thereof and having the outer edge thereof formed with a notch, a fixed stop on the field element of the motor, pins on said ring spaced apart and designed to alternately engage said stop to limit the movement of the ring with the commutator, and a pivoted hook under the control of the field element and adapted to engage in the notch in said ring to lock the latter against movement.

In testimony whereof I have signed my name to this specification in the presence of two subscribing witnesses.

GUSTAF LEANDER HALVARDSON.

Witnesses:
R. LARSSON,
G. PETTERSON.

Copies of this patent may be obtained for five cents each, by addressing the "Commissioner of Patents, Washington, D. C."